United States Patent
Suzuki

(10) Patent No.: US 7,010,955 B2
(45) Date of Patent: Mar. 14, 2006

(54) THROTTLE POSITION DETECTING APPARATUS

(75) Inventor: Michiyuki Suzuki, Shizuoka (JP)

(73) Assignee: Asahi Denso Co., LTD., Shizuoka (JP)

( * ) Notice: Subject to any disclaimer, the term of this patent is extended or adjusted under 35 U.S.C. 154(b) by 0 days.

(21) Appl. No.: 10/786,467

(22) Filed: Feb. 26, 2004

(65) Prior Publication Data
US 2004/0255658 A1  Dec. 23, 2004

(30) Foreign Application Priority Data
Feb. 27, 2003 (JP) ............... P.2003-051708

(51) Int. Cl.
*G01B 5/24* (2006.01)
(52) U.S. Cl. ............ 73/1.79; 73/1.75; 73/118.1
(58) Field of Classification Search ........ 73/1.37, 73/1.75, 1.79, 116, 117.2, 117.3, 118.1, 118.2, 73/119 R, 119 A; 74/488; 180/335
See application file for complete search history.

(56) References Cited

U.S. PATENT DOCUMENTS

| | | | |
|---|---|---|---|
| 5,133,321 A * | 7/1992 | Hering et al. ............ 123/399 |
| 5,460,035 A * | 10/1995 | Pfaffenberger ............ 73/118.1 |
| 5,828,290 A * | 10/1998 | Buss et al. ............ 338/162 |
| 6,135,227 A * | 10/2000 | Laning ............ 180/170 |
| 6,276,230 B1 * | 8/2001 | Crum et al. ............ 74/551.9 |
| 6,318,490 B1 * | 11/2001 | Laning ............ 180/170 |
| 6,699,085 B1 * | 3/2004 | Hattori ............ 440/87 |
| 6,840,096 B1 * | 1/2005 | Samoto et al. ............ 73/118.1 |
| 6,920,805 B1 * | 7/2005 | Samoto et al. ............ 74/485 |
| 2003/0159500 A1 * | 8/2003 | Samoto et al. ............ 73/118.1 |
| 2003/0159529 A1 * | 8/2003 | Samoto et al. ............ 73/865.9 |
| 2003/0172763 A1 * | 9/2003 | Samoto et al. ............ 74/485 |

FOREIGN PATENT DOCUMENTS

JP  4-254278 A  9/1992

* cited by examiner

*Primary Examiner*—Eric S. McCall
(74) *Attorney, Agent, or Firm*—Sughrue Mion, PLLC

(57) ABSTRACT

A throttle position detecting apparatus has an interlocking member being rotatable in conjunction with a throttle grip attached to a tip of a handlebar of a vehicle; a detecting unit for detecting a rotation angle of the interlocking member; and a case integrally including a first accommodation and a second accommodation, the interlocking member being rotatably accommodated in the first accommodation and the detecting unit being accommodated in the second accommodation, wherein the throttle position detecting apparatus detects a throttle position on the basis of the rotation angle of the interlocking member detected by the detecting unit.

8 Claims, 7 Drawing Sheets

THROTTLE POSITION DETECTING APPARATUS

BACKGROUND OF THE INVENTION

1. Field of the Invention

The present invention relates to a throttle position detecting apparatus for detecting a throttle position by detecting a rotation angle of a throttle grip of a vehicle having handlebars such as a motorcycle.

2. Description of the Related Art

In general, a vehicle having handlebars such as a motorcycle is equipped with a throttle grip at the tip of a handlebar and is also equipped with a throttle position detecting apparatus for allowing the vehicle to run at an arbitrary speed by detecting a throttle position on the basis of an angle of rotation, effected by the driver, of the throttle grip. Throttle position detecting apparatus having various configurations have been proposed conventionally, an example of which is one disclosed in JP-A-4-254278.

The throttle position detecting apparatus disclosed in this document is mainly composed of a drive pulley that rotates in conjunction with a throttle grip, a detection gear that is in mesh with a gear that is part of the drive pulley, and a throttle position sensor that is a potentiometer and detects a rotation angle of the detection gear. When the throttle grip is rotated, the indication value of the potentiometer is varied via the drive pulley and a throttle position is thereby detected.

However, in the above conventional throttle position detecting apparatus, the drive pulley, the detection gear, and the throttle position sensor are separate bodies and are provided in cases individually. This may cause a large assembling error. Such an assembling error causes play between the drive pulley and the detection gear, which makes it difficult to detect a correct throttle position and results in a problem that the reliability of the device is lowered.

SUMMARY OF THE INVENTION

The present invention has been made in view of the above circumstances and an object of the invention is therefore to provide a throttle position detecting apparatus in which the reliability of the device can be increased by preventing an assembling error that would otherwise occur when the device is attached to a vehicle such as a motorcycle and thereby detecting a throttle position correctly.

The invention recited in a first aspect provides a throttle position detecting apparatus having: an interlocking member being rotatable in conjunction with a throttle grip attached to a tip of a handlebar of a vehicle; a detecting unit for detecting a rotation angle of the interlocking member; and a case integrally including a first accommodation and a second accommodation, the interlocking member being rotatably accommodated in the first accommodation and the detecting unit being accommodated in the second accommodation, wherein the throttle position detecting apparatus detects a throttle position on the basis of the rotation angle of the interlocking member detected by the detecting unit.

The invention recited in a second aspect is wherein, in the throttle position detecting apparatus according to the first aspect, the detecting unit has: a rotary body rotating in conjunction with the interlocking member and having a magnet, the magnet having different poles on the surface thereof; and an angle sensor having a magnetoresistance element for detecting a rotation angle of the rotary body.

The invention recited in a third aspect is wherein, in the throttle position detecting apparatus according to the first or second aspect, the angle sensor is provided on each of a front surface and a back surface of a circuit board, and prescribed circuits are formed on the circuit board.

The invention recited in a fourth aspect is wherein, in the throttle position detecting apparatus according to any one of the first to third aspects, further comprising urging unit for urging the interlocking member toward an initial position.

BRIEF DESCRIPTION OF THE DRAWINGS

FIG. 5A is a schematic diagram showing a state that the magnetic field lines m extend in the horizontal direction and FIG. 5B shows a state that the magnetic field lines m are rotated counterclockwise by a prescribed angle;

FIG. 7A is a schematic diagram showing a state that the magnetic field lines m extend in the horizontal direction and FIG. 7B shows a state that the magnetic field lines m are rotated clockwise by a prescribed angle;

DETEILED DESCRIPTION OF THE PREFERRED EMBODIMENTS

An embodiment of the present invention will be hereinafter described in a specific manner with reference to the drawings.

Figure 1:
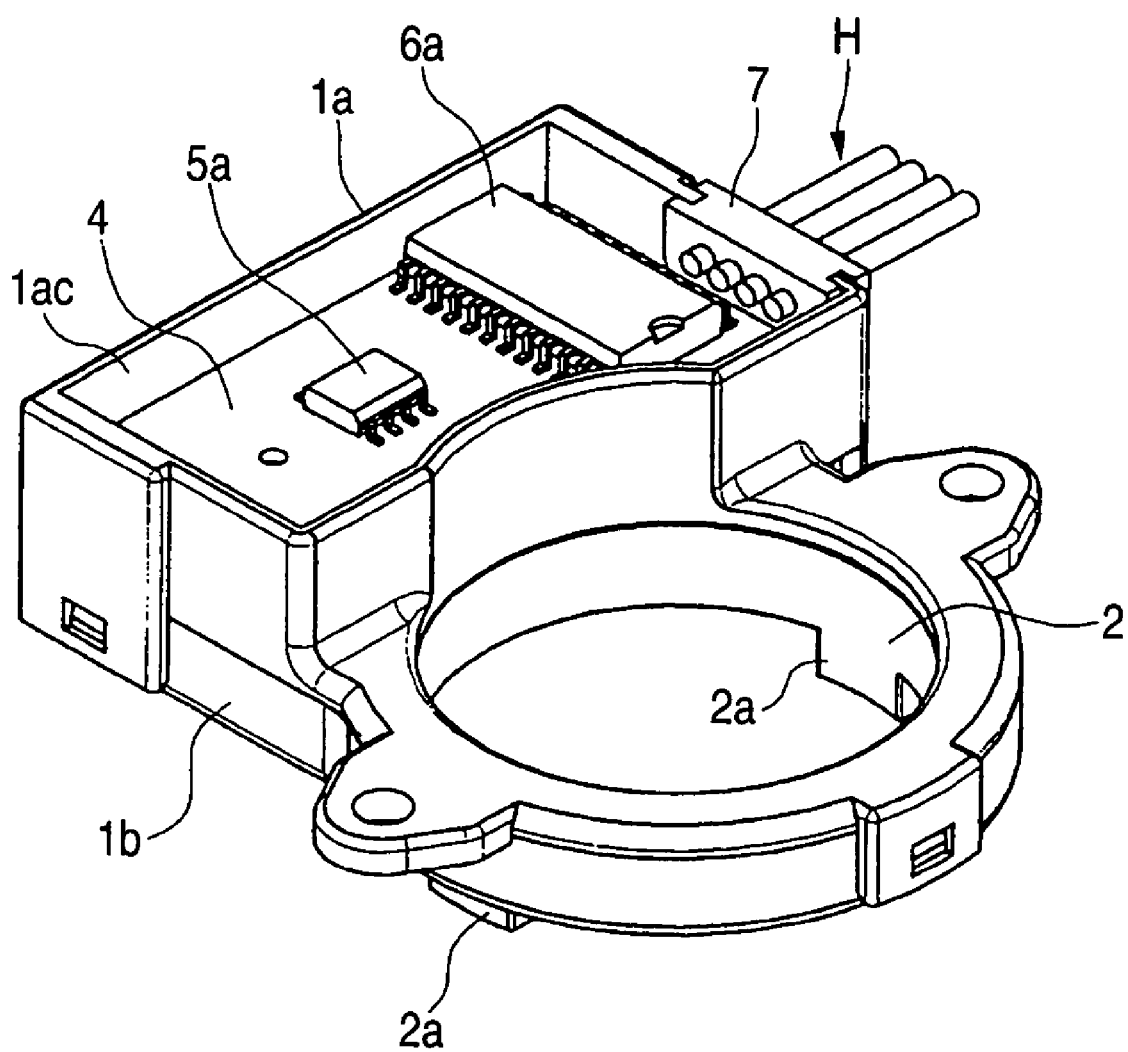
FIG. 1 is a perspective view of a throttle position detecting apparatus according to an embodiment of the present invention.
Figure 2:
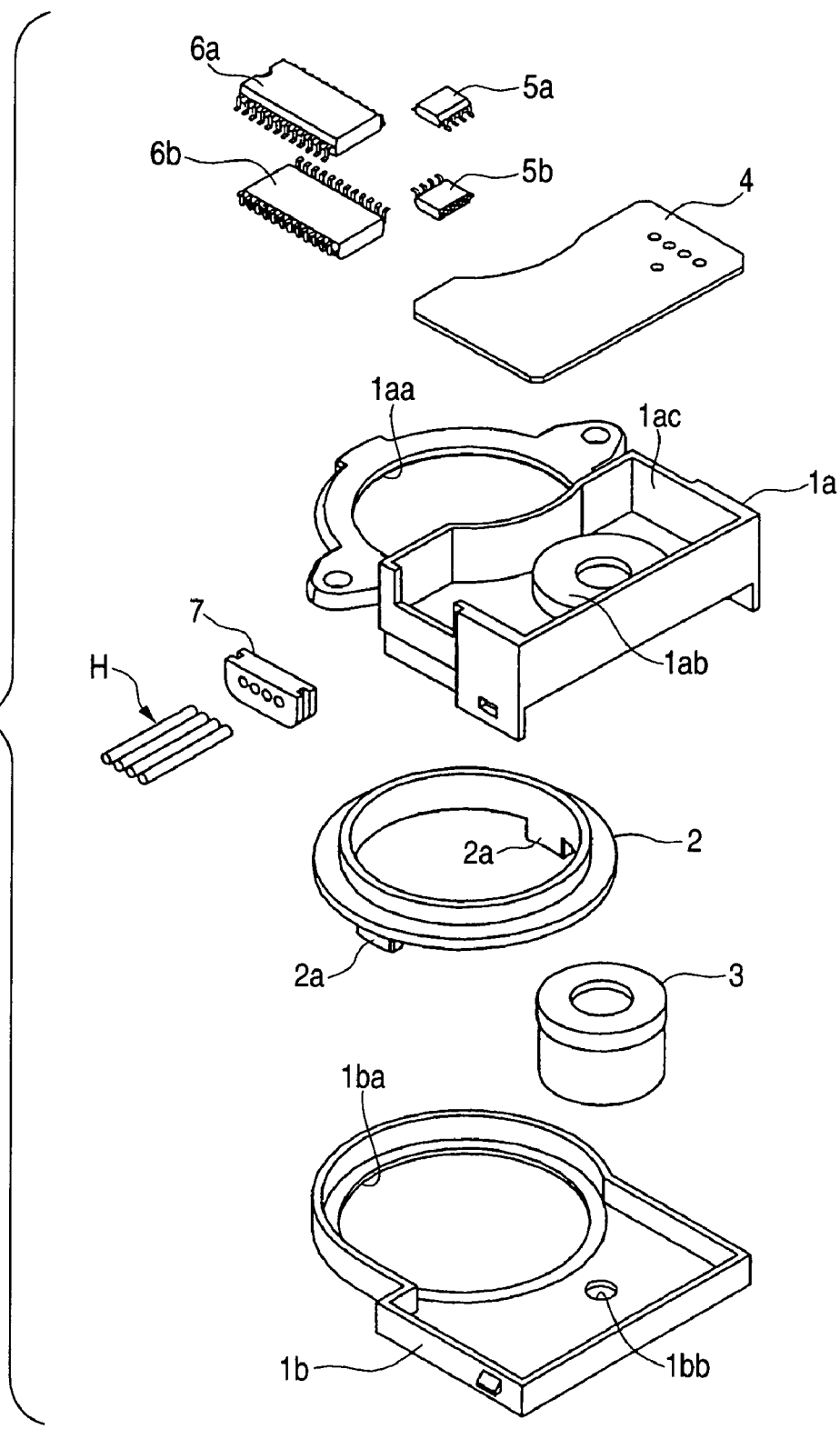
FIG. 2 is an exploded perspective view of the same.

A throttle position detecting apparatus according to the embodiment is to detect a rotation angle of a throttle grip that is attached to a handlebar of a motorcycle, and to send a resulting detection signal to an electronic control unit (ECU) of the motorcycle. As shown in FIGS. 1 and 2, the throttle position detecting apparatus is mainly composed of a case 1 that consists of a first case 1a and a second case 1b, a ring gear 2 as a interlocking member, a rotary body 3 as a detecting unit, angle sensors 5a and 5b also as the detecting unit that are provided on the front and back surfaces of a circuit board 4, respectively, and amplifiers 6a and 6b that are provided on the front and back surfaces of the circuit board 4, respectively.

The ring gear 2 assumes an annular shape and its outer circumferential side surface is formed with a plurality of teeth. A pair of fitting projections 2a project to one side (downward in FIG. 1). The fitting projections 2a are to be fitted with part of the throttle grip of a motorcycle (not shown) so as to be able to rotate in conjunction with the throttle grip; the ring gear 2 can rotate by the same angle as a rotation angle of the throttle grip.

The rotary body 3 is a generally cylindrical member that is a plastic magnet. Its outer circumferential side surface is formed with a plurality of teeth that are in mesh with the teeth on the outer circumferential side surface of the ring gear 2; the rotary body 3 can rotate in conjunction with the ring gear 2. That is, the ring gear 2 and the rotary body 3 are rotatably housed in the case 1 in a state that their teeth are in mesh with each other. The front surface (i.e., the top surface in FIG. 3) of the rotary body 3 is formed with different poles, that is, S and N poles.

The first case 1a is formed with a circular hole 1aa whose diameter is a little larger the inner diameter of the ring gear 2, as well as an accommodation recess lab (see FIGS. 2 and 3) for housing the rotary body 3 rotatably. On the other hand, the second case 1b is formed with a circular hole 1ba that corresponds to the circular hole 1aa of the first case 1a, as well as a recess 1bb capable of being fitted with a projection 3a (see FIG. 3) that projects from the rotation center of the rotary body 3.

The first case 1a and the second case 1b are engaged with each other with their one surfaces opposed to each other, whereby a portion where the circular holes 1aa and 1ba are positioned with respect to each other serves as a first accommodation portion for housing the ring gear 2 rotatably and a space between the accommodation recess 1ab and that part of the surface of the second case 1b which is close to the recess 1bb and a recess 1ac that is located on the back side of the above space and houses the circuit board 4 serve as a second accommodation portion of the invention. The teeth on the outer circumferential side surface of the ring gear 2 housed in the first accommodation portion and the teeth on the outer circumferential side surface of the rotary body 3 housed in the second accommodation portion are in mesh with each other. When the ring gear 2 rotates with rotation of the throttle grip, the rotary body 3 also rotates in conjunction with the ring gear 2.

Figure 3:
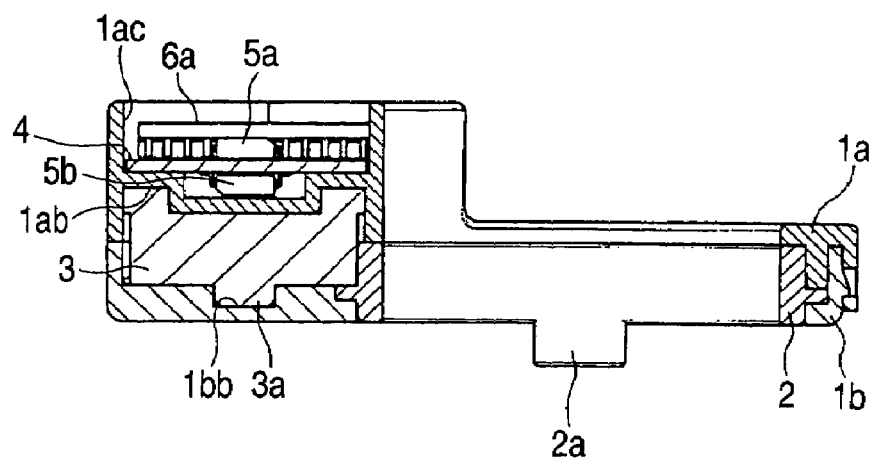
FIG. 3 is a vertical sectional view of the same.

Further, the recess 1ac is formed in the first case 1a on the back side of the accommodation recess 1ab so as to conform to the outer periphery of the circuit board 4. Prescribed circuits are printed on the front and back surfaces of the circuit board 4. And the angle sensor 5a and the amplifier 6a are provided on the front surface and the angle sensor 5b and the amplifier 6b are provided on the back surface. As shown in FIG. 3, the entire circuit board 4 is housed in the recess 1ac.

A fixing member 7 shown in FIG. 1 is fitted in a peripheral portion of the recess 1ac. A plurality of wires H are inserted in the fixing member 7. The wires H are electrically connected to the circuits on the circuit board 4 so that detection signals of the angle sensors 5a and 5b as amplified by the amplifiers 6a and 6b can be sent to an external apparatus such as an ECU. To simplify the related drawings, the wires H are drawn so as not to be connected to the circuits.

Further, although not shown in the drawings, the recess 1ac (i.e., part of the second accommodation portion) that houses the circuit board 4 is filled with a prescribed resin; that is, a resin mold is formed so as to incorporate the circuit board 4. Since the entire circuit board 4 including the angle sensors 5a and 5b are incorporated in the resin mold, the waterproofness of for the angle sensors 5a and 5b, the amplifiers 6a and 6b, and the other circuits that are formed on the circuit board 4 can be increased.

Still further, the throttle position detecting apparatus having the above configuration may be provided in a switch case that is fixed to the tip of a handlebar (on the proximal side of the throttle grip) of a motorcycle. In this case, since the switch case of the motorcycle has a waterproof function, the waterproofness of the throttle position detecting apparatus can be increased. Naturally, the throttle position detecting apparatus may be fixed to the tip portion of a handlebar separately from the switch case.

Next, the operation of the throttle position detecting apparatus having the above configuration will be described.

When the driver rotates the throttle grip that is attached to the tip of a handlebar of a motorcycle, the ring gear 2 that is fitted with part of the throttle grip rotates in conjunction with the throttle grip and the rotary body 3 also rotates on the projection 3a by an angle corresponding to a rotation angle of the ring gear 2.

Figure 4:
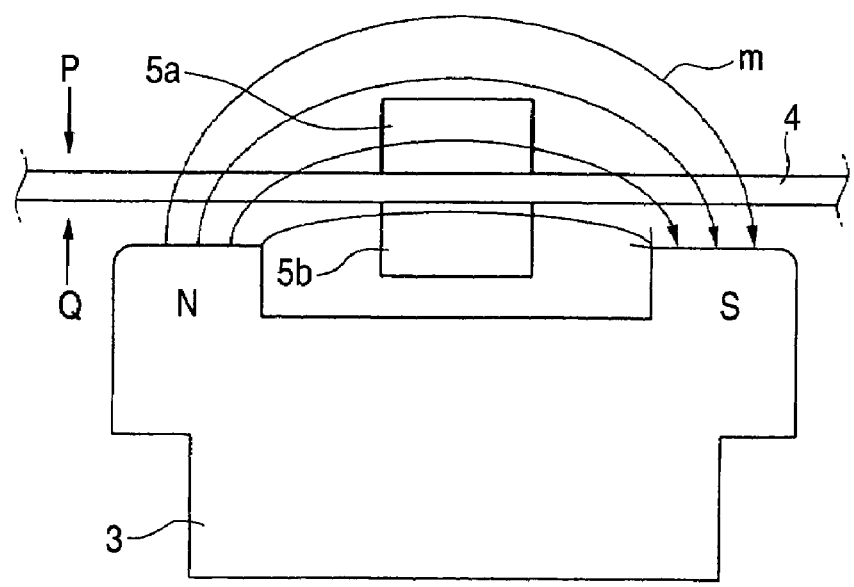
FIG. 4 is a schematic diagram showing a rotary body of the throttle position detecting apparatus according to the embodiment of the invention and magnetic field lines generated by the rotary body.
Figure 5A:
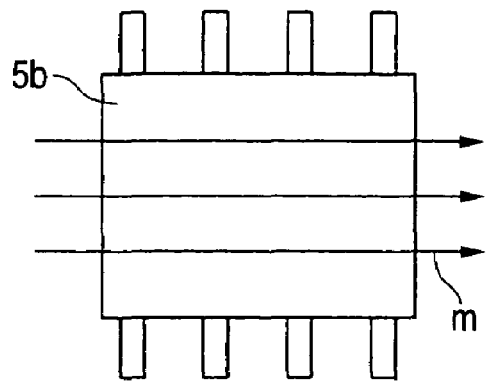
FIGS. 5A and 5B are schematic diagrams showing magnetic field lines m that pass through an angle sensor provided on the back surface of a circuit board in the throttle position detecting apparatus according to the embodiment of the invention.

As shown in FIG. 4, the surface of the rotary body 3 is formed with the N and S poles and magnetic field lines m extend from the N pole to the S pole. The magnetic field lines m influence the electrical resistance values (a magnetoresistance) of the angle sensors 5a and 5b. For example, in a state that the throttle grip is not rotated, as shown in FIG. 5A, the magnetic field lines m extending from the rotary body 3 pass through the angle sensor 5b that is provided on the back surface of the circuit board 4 from left to right (in FIG. 5A). In this state, the resistance value is approximately equal to 0.

Figure 5B:
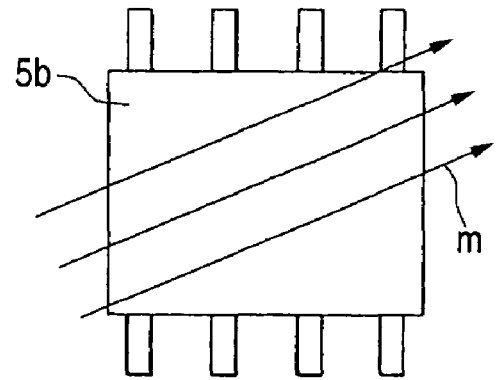
Figure 6:
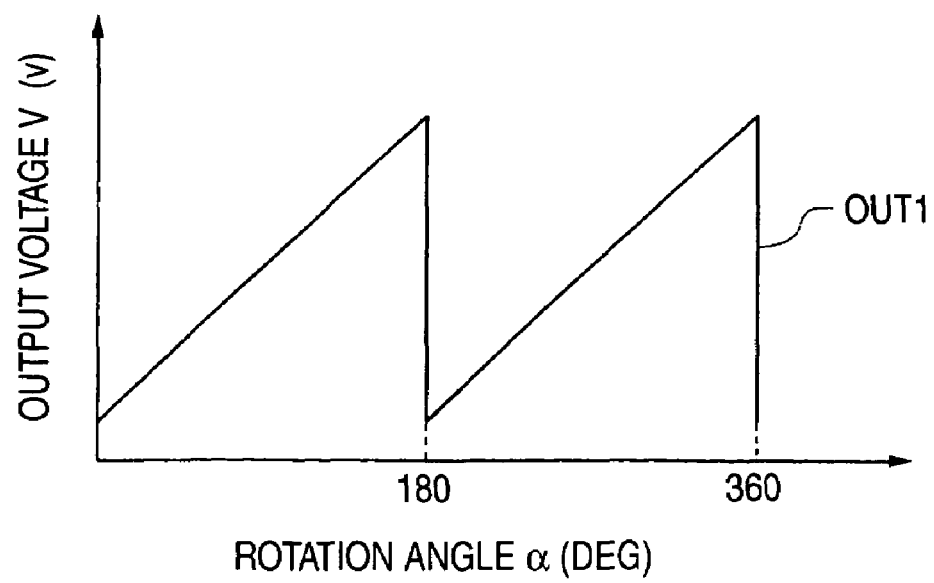
FIG. 6 is a graph showing a detection signal OUT1 that is generated by the angle sensor provided on the back surface of the circuit board in the throttle position detecting apparatus according to the embodiment of the invention.

When the rotary body 3 is rotated with rotation of the throttle grip, as shown in FIG. 5B, the magnetic field lines m are rotated counterclockwise. The angle sensor 5b is positioned so that the resistance value continues to increase and the output voltage increases linearly until the magnetic field lines m are rotated by 180°. When the magnetic field lines m have been rotated by 180°, the resistance value again becomes approximately equal to 0. As the magnetic field lines m are further rotated from 180° to 360°, the resistance value increases in the same manner as they are rotated from 0° to 180°. As a result, the output voltage varies as shown in FIG. 6 and a detection signal OUT1 is generated.

The reason why the output voltage does not become equal to 0 is that a separate resistor (not shown) is connected to the circuits on the circuit board 4. The separate resistor prevents a flow of excessive current even if short-circuiting occurs somewhere in the wires H. The detection signal OUT1 is sent to an external apparatus such as an electronic control unit for controlling the engine.

Figure 7A:
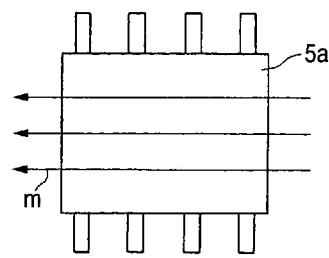
FIGS. 7A and 7B are schematic diagrams showing the magnetic field lines m that pass through an angle sensor provided on the front surface of the circuit board in the throttle position detecting apparatus according to the embodiment of the invention.
Figure 7B:
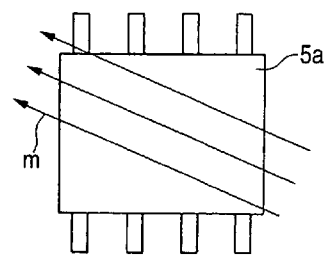

On the other hand, in a state that the throttle grip is not rotated, as shown in FIG. 7A, the magnetic field lines m extending from the rotary body 3 pass through the angle sensor 5a that is provided on the front surface of the circuit board 4 from right to left (in FIG. 7A). In this state, the resistance value is at the maximum. When the rotary body 3 is rotated with rotation of the throttle grip, as shown in FIG. 7B, the magnetic field lines m are rotated clockwise. The angle sensor 5a is positioned so that the resistance value continues to decrease and the output voltage decreases linearly until the magnetic field lines m are rotated by 180°.

Figure 8:
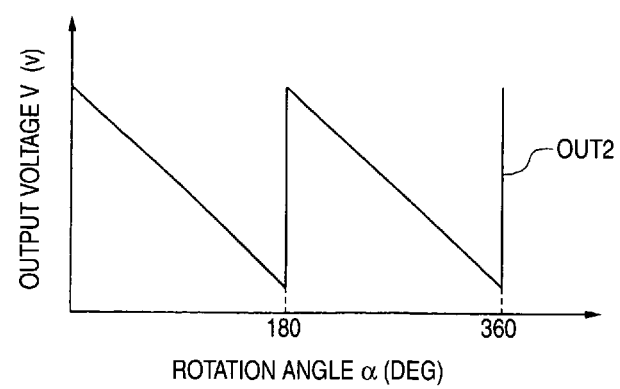
FIG. 8 is a graph showing a detection signal OUT2 that is generated by the angle sensor provided on the front surface of the circuit board in the throttle position detecting apparatus according to the embodiment of the invention.

When the magnetic field lines m have been rotated by 180°, the resistance value again becomes equal to the maximum value. As the magnetic field lines m are further rotated from 180° to 360°, the resistance value decreases in the same manner as they are rotated from 0° to 180°. As a result, the output voltage varies as shown in FIG. 8 and a detection signal OUT2 is generated. The reason why the output voltage does not become equal to 0 is that a separate resistor (not shown) is connected to the circuits on the circuit board 4 as in the case of the angle sensor 5b.

The reason why the same magnetic field lines m pass through the angle sensors 5a and 5b in the different directions (i.e., exact opposite directions) is that the angle sensors 5a and 5b are provided on the front surface and the back surface of the circuit board 4, respectively. That is, referring to FIG. 4, the magnetic field lines m go in opposite directions and are rotated in opposite directions (counterclockwise and clockwise) when the angle sensor 5b on the circuit board 4 is seen in direction Q and when the angle sensor 5a on the circuit board 4 is seen in direction P.

Figure 9:
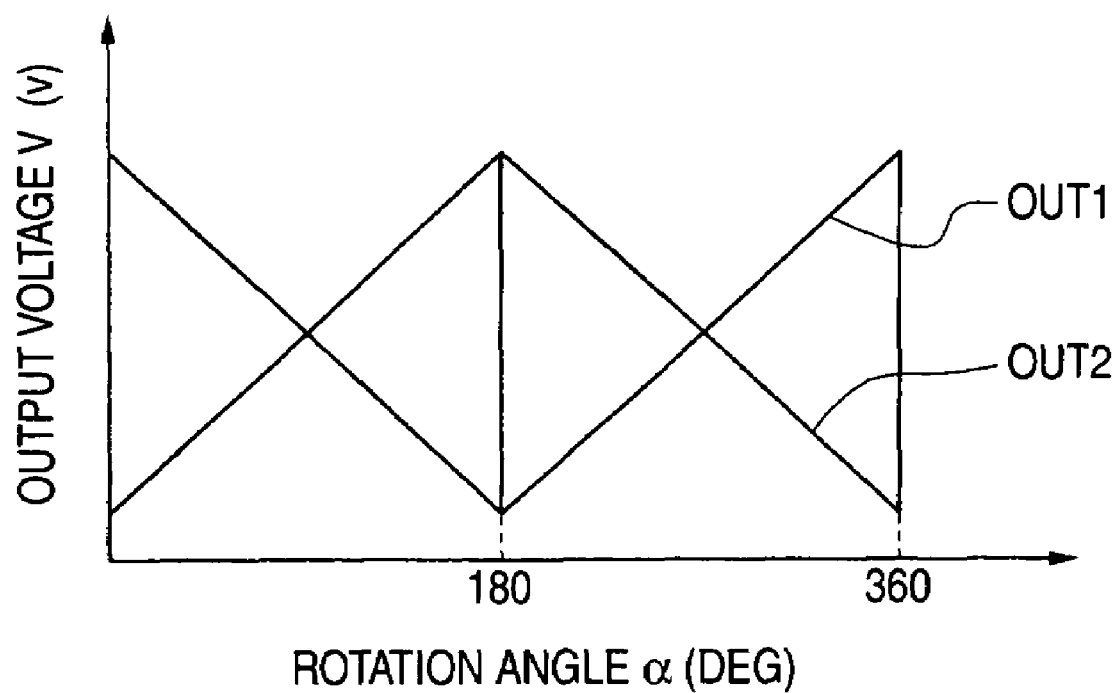
FIG. 9 is a graph in which the detection signals OUT1 and OUT2 of the throttle position detecting apparatus according to the embodiment of the invention are combined together.

The detection signals OUT1 and OUT2 that are generated simultaneously constitute a double signal system. The detection signals OUT1 and OUT2 are combined in an electronic control unit of the vehicle, whereby waveforms shown in FIG. 9 is obtained. The waveforms are such that the output voltages vary in opposite directions as the rotation angle (horizontal axis) varies from 0° to 180° or 180° to 360°.

In each of the above ranges, the sum of detection signals OUT1 and OUT2 at a prescribed rotation angle is always the same. Therefore, if one of the angle sensors 5a and 5b or the wiring is broken, the output voltage of the one angle sensor decreases and the sum of the output voltages varies. This makes it possible to recognize that a problem has occurred in the one angle sensor or the wiring. Even in such a case, various controls can be performed on the basis of only the output voltage of the other angle sensor and hence safety is secured.

As described above, according to the embodiment, the ring gear 2 as the interlocking member and the rotary body 3 and the angle sensors 5a and 5b as the detecting unit are incorporated together in the single case 1. Therefore, the assembling error that would otherwise occur in attaching the throttle position detecting apparatus to a vehicle can be prevented and a throttle position can be detected correctly, whereby the reliability of the device can be increased.

A rotation angle of the rotary body 3 is detected by the angle sensors 5a and 5b in a non-contact manner; that is, there is no portion where two members contact each other (e.g., a potentiometer is not used) and hence no wear occurs. This makes it possible to increase the durability of the throttle position detecting apparatus. Further, since the angle sensors 5a and 5b are provided on the front surface and the back surface of the circuit board 4, respectively, a rotation angle of the rotary body 3 can be detected by each of the angle sensors 5a and 5b and a failure in either of the angle sensors 5a and 5b can be found early. Even if a failure has occurred in one of the angle sensors 5a and 5b, it is possible to continue to detect the throttle position on the basis of the detection value of the other angle sensor. This unit increase in safety.

Figure 10:
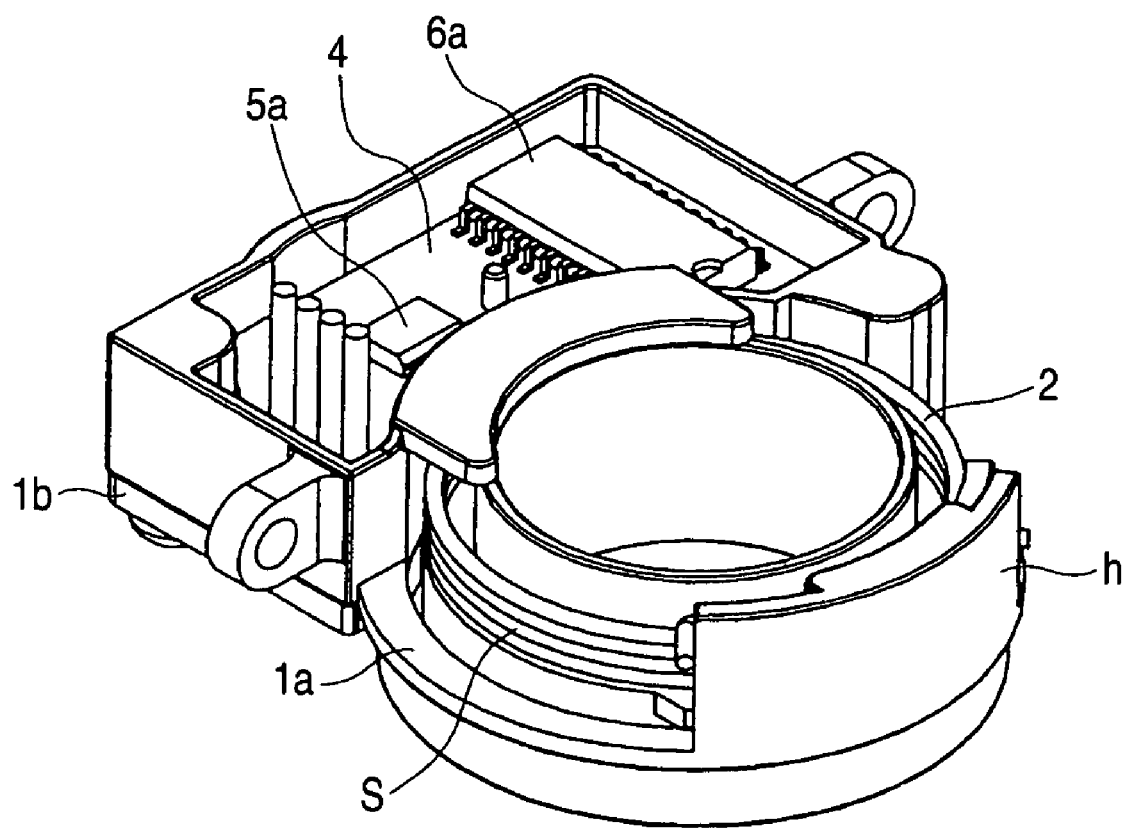
FIG. 10 is a perspective view of a throttle position detecting apparatus according to another embodiment of the invention.

The throttle position detecting apparatus according to the embodiment has been described above. However, the invention is not limited to it. FIG. 10 shows another exemplary throttle position detecting apparatus in which a flange h erects from part of the periphery of the circular hole 1aa of the first case 1a and a torsion coil spring S is provided as an urging unit for connecting part of the flange h and the ring gear 2. The torsion coil spring S is to always urge the ring gear 2 toward the initial position. The torsion coil spring S can always fix the zero point of the ring gear 2 and hence can absorb play between the throttle grip and the ring gear 2.

Further, the above embodiment is directed to the case of detecting a throttle position by detecting a rotation angle of the throttle grip that is attached to the tip of a handlebar of a motorcycle. However, the invention is not limited to it and can also be applied to a throttle position detecting apparatus other kinds of vehicles having a throttle grip that is attached to the tip of a handlebar (e.g., a buggy).

According to the invention recited in a first aspect, the interlocking member and the detecting unit are housed in the case in which the first accommodation portion and the second accommodation portion are integrated with each other. Therefore, an assembling error that would otherwise occur when the throttle position detecting apparatus is attached to a vehicle is prevented and a throttle position is detected correctly, whereby the reliability of the device can be increased.

According to the invention recited in a second aspect, a rotation angle of the rotary body that is a magnet is detected by the angle sensor that employs a magnetoresistance element. Therefore, there is no portion where two members contact each other (e.g., a potentiometer is not used) and hence no wear occurs. This makes it possible to increase the durability of the throttle position detecting apparatus.

According to the invention recited in a third aspect, the angle sensor is provided on each of the front surface and the back surface of the substrate. Therefore, a rotation angle of the rotary body can be detected by each of the angle sensors and a failure in either angle sensor can be found early. Even if a failure has occurred in one of the angle sensors, it is possible to continue to detect the throttle position on the basis of the detection value of the other angle sensor. This unit increase in safety.

According to the invention recited in a fourth aspect, the urging unit for always urging the interlocking member toward an initial position is provided. Therefore, the zero point of the interlocking member can always be fixed and hence play between the throttle grip and the interlocking member can be absorbed.

What is claimed is:

1. A throttle position detecting apparatus comprising:
    an interlocking member being rotatable in conjunction with a throttle grip attached to a tip of a handlebar of a vehicle;
    a detecting unit for detecting a rotation angle of the interlocking member; and
    a case integrally including a first accommodation and a second accommodation, the interlocking member being rotatably and completely accommodated in the first accommodation and the detecting unit being accommodated in the second accommodation,
    wherein the throttle position detecting apparatus detects a throttle position on the basis of the rotation angle of the interlocking member detected by the detecting unit,
    wherein the interlocking member is a ring gear.

2. The throttle position detecting apparatus according to claim 1, wherein the detecting unit comprises: a rotary body rotating in conjunction with the interlocking member and having a magnet, the magnet having different poles on the surface thereof; and an angle sensor having a magnetoresistance element for detecting a rotation angle of the rotary body.

3. The throttle position detecting apparatus according to claim 2, further comprising an urging unit for urging the interlocking member toward an initial position.

4. The throttle position detecting apparatus according to claim 1, further comprising an urging unit for urging the interlocking member toward an initial position.

5. A throttle position detecting apparatus comprising:
an interlocking member being rotatable in conjunction with a throttle grip attached to a tip of a handlebar of a vehicle;
a detecting unit for detecting a rotation angle of the interlocking member; and
a case integrally including a first accommodation and a second accommodation, the interlocking member being rotatably accommodated in the first accommodation and the detecting unit being accommodated in the second accommodation,
wherein the throttle position detecting apparatus detects a throttle position on the basis of the rotation angle of the interlocking member detected by the detecting unit,
wherein the angle sensor is provided on each of a front surface and a back surface of a circuit board, and prescribed circuits are formed on the circuit board.

6. The throttle position detecting apparatus according to claim 5, further comprising an urging unit for urging the interlocking member toward an initial position.

7. A throttle position detecting apparatus comprising:
an interlocking member being rotatable in conjunction with a throttle grip attached to a tip of a handlebar of a vehicle;
a detecting unit for detecting a rotation angle of the interlocking member; and
a case integrally including a first accommodation and a second accommodation, the interlocking member being rotatably accommodated in the first accommodation and the detecting unit being accommodated in the second accommodation,
wherein the throttle position detecting apparatus detects a throttle position on the basis of the rotation angle of the interlocking member detected by the detecting unit,
wherein the detecting unit comprises: a rotary body rotating in conjunction with the interlocking member and having a magnet, the magnet having different poles on the surface thereof; and an angle sensor having a magnetoresistance element for detecting a rotation angle of the rotary body,
wherein the angle sensor is provided on each of a front surface and a back surface of a circuit board, and prescribed circuits are formed on the circuit board.

8. The throttle position detecting apparatus according to claim 7, further comprising an urging unit for urging the interlocking member toward an initial position.

* * * * *